D. W. PATTERSON.
WHEEL MOUNTED SCOOP.
APPLICATION FILED SEPT. 28, 1910.
999,857.
Patented Aug. 8, 1911.
2 SHEETS—SHEET 1.
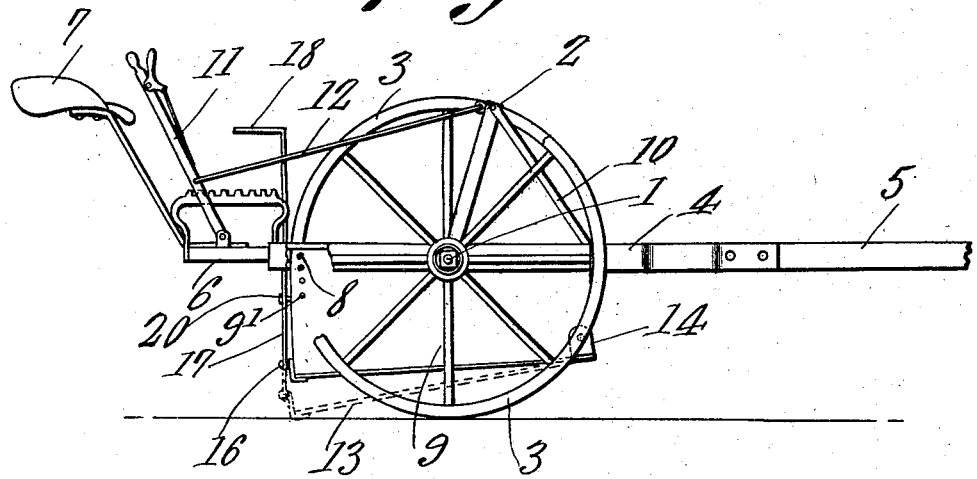
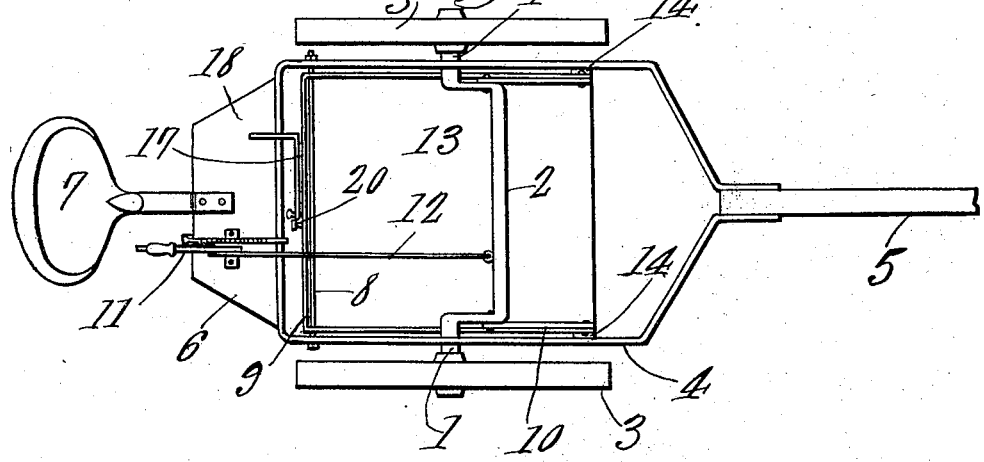

D. W. PATTERSON.
WHEEL MOUNTED SCOOP.
APPLICATION FILED SEPT. 28, 1910.
999,857.
Patented Aug. 8, 1911.
2 SHEETS—SHEET 2.
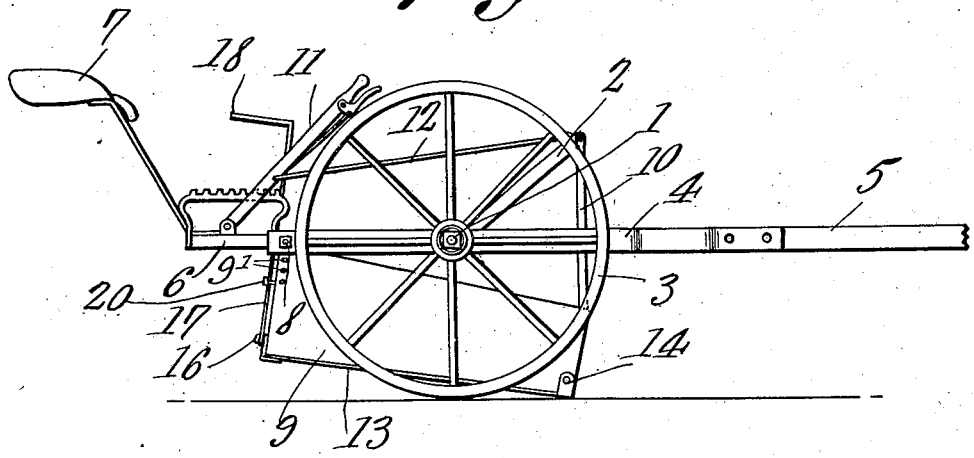
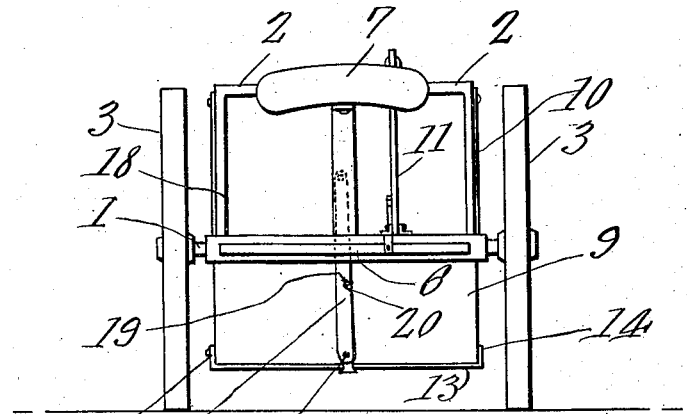
Witnesses
David W. Patterson, Inventor
by C. A. Snow & Co.
Attorneys

UNITED STATES PATENT OFFICE.

DAVID W. PATTERSON, OF HELENA, MONTANA.

WHEEL-MOUNTED SCOOP.

999,857.     Specification of Letters Patent.     Patented Aug. 8, 1911.

Application filed September 28, 1910. Serial No. 584,317.

*To all whom it may concern:*

Be it known that I, DAVID W. PATTERSON, a citizen of the United States, residing at Helena, in the county of Lewis and Clark and State of Montana, have invented a new and useful Wheel-Mounted Scoop, of which the following is a specification.

This invention has relation to wheel-mounted scoops and consists in the novel construction and arrangement of its parts as hereinafter shown and described.

The object of the invention is to provide a portable scoop which in turn is provided with a pivoted bottom, the pivotal point being in the vicinity of the forward end of the scoop.

Means is provided for raising and lowering the forward end of the scoop whereby the forward edge of the bottom may be used as a scraper or earth cutter when the scoop is being loaded. A lever mechanism is provided for swinging an arch axle which in turn raises or lowers the forward end of the scoop and a locking device is provided for holding the rear end portion of the bottom of the scoop from swinging in a downward direction with relation to the body of the same.

In the accompanying drawings;—Figure 1 is a side elevation of the scoop illustrating the bottom of the same in open position. Fig. 2 is a top plan view of the wheel-mounted scoop. Fig. 3 is a side elevation of the scoop illustrating the position of the parts when the scoop is about to take in a load. Fig. 4 is a rear end elevation of the scoop.

The scoop consists of an axle 1 which is provided with an intermediate arch or crank portion 2. Supporting wheels 3 are journaled upon the end portions of the axle 1 and an open center frame 4 is also supported upon the end portions of the said axle 1. A draft tongue 5 is attached to the forward end of the frame 4. A platform 6 is fixed to the rear end of the frame 4 and an operator's seat 7 is mounted upon the said platform. A rod 8 passes transversely through the rear portion of the frame 4 from side to side thereof and a scoop 9 is provided in its side with a series of perforations 9' which are adapted to receive the said rod 8 whereby the said scoop may be adjusted in position with relation to the frame 4. Links 10 pivotally connect the forward side portions of the scoop 9 with the upper intermediate crank portion 2 of the axle 1. A lever mechanism 11 is mounted upon the platform 6 and a rod 12 operatively connects the said lever 11 with the intermediate portion 2 of the axle 1. Any suitable means may be provided for holding the lever 11 in an adjusted position. By this arrangement of parts it will be seen that by swinging the lever 11 and moving the rod 12 longitudinally, the intermediate portion 2 of the axle 1 will be swung upon the ends of the said axle as an axis and the link 10 will be moved longitudinally whereby the forward end portions of the scoop 9 will be swung vertically upon the rod 8 as a pivot.

The scoop 9 is provided with a bottom 13 which in turn consists of a plate having at its forward end and at its side upturned lugs 14, which are pivotally attached against the outer surfaces of the sides of the scoop 9. A pin 16 is secured to the rear edge of the pivoted bottom 13 at a point intermediate the side edges thereof and the lower end of a bar 17 is pivoted upon said pin 16. The bar 17 is provided at its upper end with a rearwardly disposed handle 18 and at a point between its ends with a notch 19. A pin 20 is mounted upon the rear side of the scoop 9 and at times is adapted to enter the notch 19 of the bar 17 whereby the said bar 17 is held in an elevated position and the bottom 13 is held closed against the lower edges of the scoop 9.

In operation the scraper is used as follows. When it is intended to move from one point to another upon the surface of the ground the lever 11 is swung so that the intermediate blank portion 2 of the axle 1 is held in an elevated position as shown in Fig. 1 of the drawing. Thus the forward end portion of the scoop 9 is held in a position elevated above the surface of the ground and the scraper may be readily moved from point to point. When it is desired to load the scraper with material at the surface of the ground, the lever 11 is swung so that the intermediate portion 2 of the axle 1 moves in a downward direction when the forward edge of the bottom 13 of the scoop 9 will come in contact with the surface of the ground and as the scoop is moved along the ground the material is banked up in the rear portion of the scoop. When the scoop has been filled the lever 11 is swung in a rearward direction whereby the intermediate portion 2 of the axle 1 is elevated and the forward portion of the scoop 9 is elevated and the material thus loaded upon the scoop may be transported to a point where it is desired to dump the same. In order to dump the same the operator engages the rearwardly disposed portion 18 of the bar 17 and swings the said bar to one side whereby the notch 19 thereof is disengaged from the pin 20 at the rear edge at the rear side of the scoop 9 and thus the rear portion of the bottom 13 is free to swing which it does under the weight of the load carried by the scraper as the material may pass out of the body of the scoop 19 below the lower edges thereof and above the rear portion of the bottom 13. As the rear portion of the bottom 13 drags upon the surface of the ground the material which escapes from the scoop 19 is distributed or spread upon the surface of the ground.

Having described the invention what I claim as new and desire to secure by Letters Patent is:—

1. A scoop comprising an arched axle, supporting wheels journaled upon the ends of the axle, a frame mounted upon the ends of the axle, a lever mechanism mounted upon the frame and operatively connected with the arch of the axle and adapted when manipulated to turn the said arch in the axle upon its end as an axis, a scoop pivotally mounted upon the rear portion of the frame and means connecting the forward portion of said scoop with the arch of the axle.

2. A scoop comprising an arched axle, supporting wheels journaled at the ends thereof, a frame mounted upon the ends thereof, a lever mounted mechanism mounted upon the frame and operatively connected with the arched portion of the axle to swing the same, a scoop pivoted at the rear end of the frame, links connecting the forward portion of the scoop with the arched portion of the axle, a bottom pivotally attached to the forward portion of the scoop, and a latch mechanism for holding the rear portion of the bottom closed against the scoop.

3. A scoop comprising an arched axle, supporting wheels journaled at the ends thereof, a frame mounted upon the end portions of the axle, a lever mechanism mounted upon the frame and operatively connected with the arched portion of the axle, a scoop adjustably pivoted at the rear portion of the frame, and links pivotally connected at their forward ends to the scoop and at their rear ends to the intermediate arched portion of the axle.

In testimony that I claim the foregoing as my own, I have hereto affixed my signature in the presence of two witnesses.

DAVID W. PATTERSON.

Witnesses:
 ANDREW J. CUPJABS,
 FLOYD P. HOWE.

Copies of this patent may be obtained for five cents each, by addressing the "Commissioner of Patents, Washington, D. C."